United States Patent
Simmons et al.

[11] 3,898,890
[45] Aug. 12, 1975

[54] SCREW-TYPE ACTUATORS

[75] Inventors: John Richard Simmons; Trevor John Hammond, both of Wolverhampton, England

[73] Assignee: Joseph Lucas (Industries) Limited, Birmingham, England

[22] Filed: Feb. 19, 1974

[21] Appl. No.: 443,793

[30] Foreign Application Priority Data
Feb. 27, 1973  United Kingdom............... 9692/73

[52] U.S. Cl............. 74/89.15; 74/424.8 B; 74/459; 192/8 R
[51] Int. Cl............................................ F16h 27/02
[58] Field of Search........... 74/89.15, 459, 424.8 B, 74/424.8 R, 89.15; 192/192.8 R

[56] References Cited
UNITED STATES PATENTS
594,741  11/1897  Harwood ............................. 74/459
3,803,926  4/1974  Winter .......................... 74/424.8 B Primary Examiner—Samuel Scott
Assistant Examiner—Wesley S. Ratliff, Jr.
Attorney, Agent, or Firm—Holman & Stern

[57] ABSTRACT

A screw and ball-nut type actuator has a second screw secured to the main screw for axial and rotary movement with the main screw. The thread of the second screw is of opposite hand to that of the main screw. A drive nut engages the second screw and is itself rotated by an external drive. Axial movement of the drive nut in opposite directions is resisted by brake members which can rotate in respective opposite directions. An axial load on the main screw ball nut urges the second screw into engagement with the one of the brake members which is restrianed against any rotation of the main screw resulting from the aforesaid load on the ball nut.

4 Claims, 1 Drawing Figure

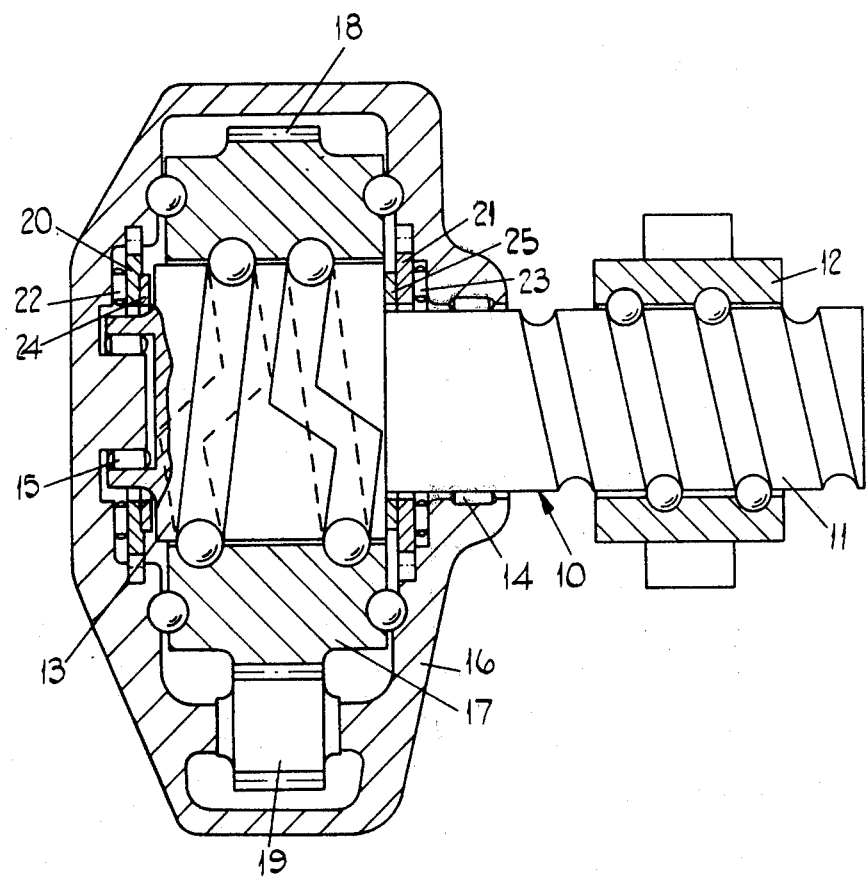

SCREW-TYPE ACTUATORS

This invention relates to screw type actuators of the kind comprising a screw, a ball type nut on the screw, means for driving the screw and an automatic brake device for preventing a load applied to the nut from rotating the screw.

With such actuators, in conventional designs, it is often necessary for the drive means to have to provide a torque sufficient to overcome the brake device before the nut can be driven in the direction in which it is loaded.

It is an object of the invention to provide a screw-type actuator of the kind specified in which this disadvantage is avoided.

According to the invention a screw-type actuator comprises a body, a screw journalled in said body, a first ball-type nut engaging said screw, a drive element having a thread of opposite hand to said screw and being connected to said screw for axial and rotary movement therewith, a second ball-type nut engaging said drive element thread, means for applying an external drive to said second nut, and first and second brake members respectively operable to prevent rotation of said screw in opposite directions, said brake members being actuable in response to axial movement of said drive member in respective opposite directions.

An example of the invention is shown diagrammatically in section in the accompanying drawing.

The actuator shown includes a screw 10 with a right hand screw-threaded shank 11 on which a ball-type but 12 is engaged. The screw 10 has an end portion 13 of increased diameter formed with an external left-hand screw thread. The screw 10 is supported in bearings 14, 15 in a body 16 in a manner to permit axial movement of the screw relative to the body 16.

Also mounted in the body is a second ball-type nut 17 which co-acts with the left-hand threaded portion 13. The nut 17 is provided with gear teeth 18 which mesh a drive pinion 19 to which driving torque is applied in use by a suitable motor (not shown).

A pair of unidirectionally rotatable annular members 20, 21 are provided in the body on opposite axial sides of the portion 13. Each such member 20, 21 may be in the form of a ratchet wheel unit with co-acting ratchets, so that the member 20 can only rotate in an anti-clockwise direction as viewed from the left of the drawing and the member 21 can only rotate in a clockwise direction. Each member 20, 21 is supported on a thrust bearing 22, 23 and each has a friction pad 24, 25 for engaging the portion 13.

When a tensile load is applied to the nut 12, i.e. a load towards the right of the drawing, the screw 10 will move to the right and portion 13 will engage the member 21. There will be a tendency for the screw 10 to rotate in an anti-clockwise direction but this is prevented by the ratchets associated with the member 21. When an anticlockwise torque is applied to the nut 17, the effect of the left-hand thread on the portion 13 will be to move this towards the left thereby disengaging or at least partially disengaging the portion 13 from the member 21, thereby allowing the screw 10 to be driven in an anti-clockwise direction. When a clockwise torque is applied to the nut 17 the member 21 is allowed to rotate so that the screw 10 is rotated in the clockwise direction.

When there is a compressive load on the nut 21 the portion 13 will be loaded against the member 20 and will tend to turn clockwise. This is prevented but, as before, application of the torque in either direction to the nut 17 releases the brake and allows turning of the screw 10.

We claim:

1. A screw-type actuator comprising a body, a screw journalled in said body, a first ball-type nut engaging said screw, a drive element having a thread of opposite hand to said screw and being connected to said screw for axial and rotary movement therewith, a second ball-type nut engaging said drive element thread, said first nut being freely movable axially and rotationally with respect to said second nut, means for applying an external drive to said second nut, and first and second brake members respectively operable to prevent rotation of said screw in opposite directions, said brake members being engageable by said drive element in response to axial movement of said drive element in respective opposite directions, whereby said screw is restrained by said brake members against rotation in response to axial loads applied in either direction to said first nut, and application of a drive to said second nut is operative to release whichever of said brake members is actuated.

2. An actuator as claimed in claim 1 in which said brake members are mounted in said body for free rotation in respective opposite directions, and are respectively drivingly engageable with said screw as a result of said axial movement thereof.

3. An actuator as claimed in claim 2 in which said brake members are in the form of ratchet wheels.

4. An actuator as claimed in claim 2 in which said first and second brake members are restrained against movement in the respective directions of rotation of said screw in response to those axial loads on said first nut which urge said first screw into frictional driving engagement with said first and second brake members respectively.

* * * * *